United States Patent [19]
Kamei et al.

[11] Patent Number: 5,609,947
[45] Date of Patent: Mar. 11, 1997

[54] LAMINATED NON-WOVEN FABRIC FILTERING MEDIUM AND METHOD FOR PRODUCING SAME

[75] Inventors: Toshikazu Kamei, Isehara; Hidetoshi Takeuchi; Makoto Suzuki, both of Yokohama, all of Japan

[73] Assignee: Tonen Chemical Corporation, Tokyo, Japan

[21] Appl. No.: 534,309

[22] Filed: Sep. 27, 1995

[51] Int. Cl.$^6$ ........................................................ B32B 7/02
[52] U.S. Cl. ............................ 428/212; 28/104; 28/117; 428/218; 428/310.5; 428/903; 429/247; 442/384; 428/311.51
[58] Field of Search ........................ 428/137, 212, 428/218, 284, 286, 298, 299, 306.8, 310.5, 311.5, 300, 903, 220; 28/104, 117; 429/247

[56] References Cited

U.S. PATENT DOCUMENTS

| | | | |
|---|---|---|---|
| 3,120,463 | 2/1964 | Russell | 428/299 |
| 4,251,587 | 2/1981 | Mimura et al. | 428/299 |
| 4,970,104 | 11/1990 | Radwanshi | 428/903 |
| 5,039,431 | 8/1991 | Johnson et al. | 428/903 |
| 5,175,042 | 12/1992 | Chomarat | 428/299 |

*Primary Examiner*—James J. Bell
*Attorney, Agent, or Firm*—Sughrue, Mion, Zinn, Macpeak & Seas

[57] ABSTRACT

A laminated non-woven fabric for filtering medium, which is composed of a plurality of non-woven fabric layers having different average pore sizes and laminated in the order of the average pore size, and a plurality of entangled regions interposed between any of adjacent two non-woven fabric layers which is formed by causing fibers of one of the adjacent two non-woven fabric layers to penetrate into the other layers to entangle the penetrated fibers with fibers of the other layers. The presence of the entangled regions provide a gradual change of the pore size from a non-woven fabric layer to another non-woven fabric layer to result in a good filtering efficiency and an elongated lifetime of a filter.

7 Claims, 1 Drawing Sheet

LAMINATED NON-WOVEN FABRIC FILTERING MEDIUM AND METHOD FOR PRODUCING SAME

BACKGROUND OF THE INVENTION

The present invention relates to a laminated non-woven fabric for use in a filter and a method for producing the laminated non-woven fabric. In particular, the present invention relates to a laminated non-woven fabric having an excellent filtering efficiency and a long lifetime, and a method for producing such laminated non-woven fabric.

Recently, a non-woven fabric has come to be used as the filtering medium for an air filter, a filter for liquid material, etc. and the production of the non-woven fabric is increasing nowadays.

The non-woven fabric for use in a filter is preferred to have a large pore size at the inlet side (upstream side) and a small pore size at the outlet side (downstream side). To meet this requirement, it has been practiced to laminate a non-woven fabric having a small packing density onto another non-woven fabric having a large packing density, or laminate a non-woven fabric having a large average fiber diameter onto another non-woven fabric having a small average fiber diameter. However, when the non-woven fabrics are laminated with an adhesive, there have been problems such as rapid increasing in filtering resistance at the interface of the laminated fabrics and dissolution of the adhesive into liquid to be filtered. When the filtering resistance increases rapidly at the interface, the pressure loss arisen there causes the peeling of the laminated non-woven fabric layers and accumulation of solid matters, this shortening the lifetime of a filtering medium. Another method of laminating two sheets of non-woven fabric by heat fusing has been proposed. However, the laminated non-woven fabric produced by such a method also suffers from rapid increasing in filtering resistance at the interface.

OBJECT AND SUMMARY OF THE INVENTION

Accordingly, an object of the present invention is to provide a laminated non-woven fabric for use as a filtering medium, which has a high filtering efficiency and an elongated lifetime. Another object of the present invention is to provide a method for producing such a laminated non-woven fabric.

As a result of the intense research in view of the above objects, the inventors have found it necessary in order to obtain a laminated non-woven fabric having a high filtering efficiency and an elongated lifetime that each of non-woven fabric layers is laminated in the order of the average pore size and that the pore size does not change abruptly at the interface between the adjacent non-woven fabric layers. The inventors have further found that such a laminated non-woven fabric can be produced by spraying water jet onto the surface of a stack comprising a plurality of non-woven fabric layers having different pore sizes and stacked in the order of the average pore size, thereby causing a part of fibers in the upstream side layer to penetrate into the adjacent, downstream side layer along the passing direction of the water jet to form entangled regions of the fibers of the adjacent two layers. The present invention has been accomplished based on these findings.

Thus, in a first aspect of the present invention, there is provided a laminated non-woven fabric for filtering medium, which comprises a plurality of non-woven fabric layers having different average pore sizes and laminated in the order of the average pore size, and a plurality of entangled regions interposed between any of adjacent two non-woven fabric layers which is formed by causing fibers of one of the adjacent two non-woven fabric layers to penetrate into the other layers to entangle the penetrated fibers with fibers of the other layers.

In a second aspect of the present invention, there is provided a method of producing the laminated non-woven fabric as defined above, which comprises the steps of (a) stacking a plurality of non-woven fabric layers having different average pore sizes in the order of the average pore size, and (b) bonding the stacked non-woven fabric layers by spraying water jet onto one of the surfaces of the resulting stack to cause fibers of the upstream layers to penetrate into the adjacent, downstream layers thereby entangling the penetrated fibers with fibers of the adjacent, downstream layers.

DETAILED DESCRIPTION OF THE INVENTION

The present invention will be described below more in detail.

[1] Production Method

The laminated non-woven fabric for use in a filter of the present invention may be produced by stacking a plurality of non-woven fabric layers having different average pore sizes in the order of the average pore size, and spraying the water jet onto one of the surfaces of the resulting stack. In the following, a method for producing a laminated non-woven fabric of two layers (first non-woven fabric and second non-woven fabric) will be described. However, it is to be understood that the present invention is not intended to be limited to the two-layered laminated non-woven fabric.

The thermoplastic resin for fibers constituting the non-woven fabric used in the present invention is not critically restricted, and may include polyolefin such as polyethylene, polypropylene, etc., polyester such as polyethylene terephthalate, polybutylene terephthalate, etc., polyamide such as nylon 6, nylon 66, nylon 46, etc., and other polymers such as polyvinyl chloride, polyvinylidene chloride, polystyrene, polycarbonate, polyvinylidene fluoride, etc. In particular, polyolefin and polyamide are preferable.

The non-woven fabric to be used in the present invention is not practically restricted as long as made of the thermoplastic resin exemplified above, and may be produced by a known method such as melt blow method, spun bonding method, etc. A melt-blown non-woven fabric is particularly preferable in view of filtering efficiency of a resulting filter.

The first non-woven fabric is preferred to have an average pore size of 5–30 μm and a thickness of 0.3–2.0 mm, and the second non-woven fabric to have an average pore size of 20–100 μm and a thickness of 1–8 mm. The average pore size of the second non-woven fabric is preferred to be larger than that of the first non-woven fabric by 50–70 μm. A basis weight, gas permeability and average fiber diameter of each of the first and second non-woven fabrics are preferably 20–100 g/m², 15–300 cc/cm²/sec and 0.5–20 μm, respectively.

The average pore size depends on the average fiber diameter and/or the packing density of the non-woven fabric. Generally, the larger the average fiber diameter, the larger the average pore size. On the other hand, the larger the packing density, the smaller the average pore size. In the present invention, it is preferred to use a plurality of non-woven fabric layers which are different from each other in both the average pore size and the average fiber diameter.

Figure 1:
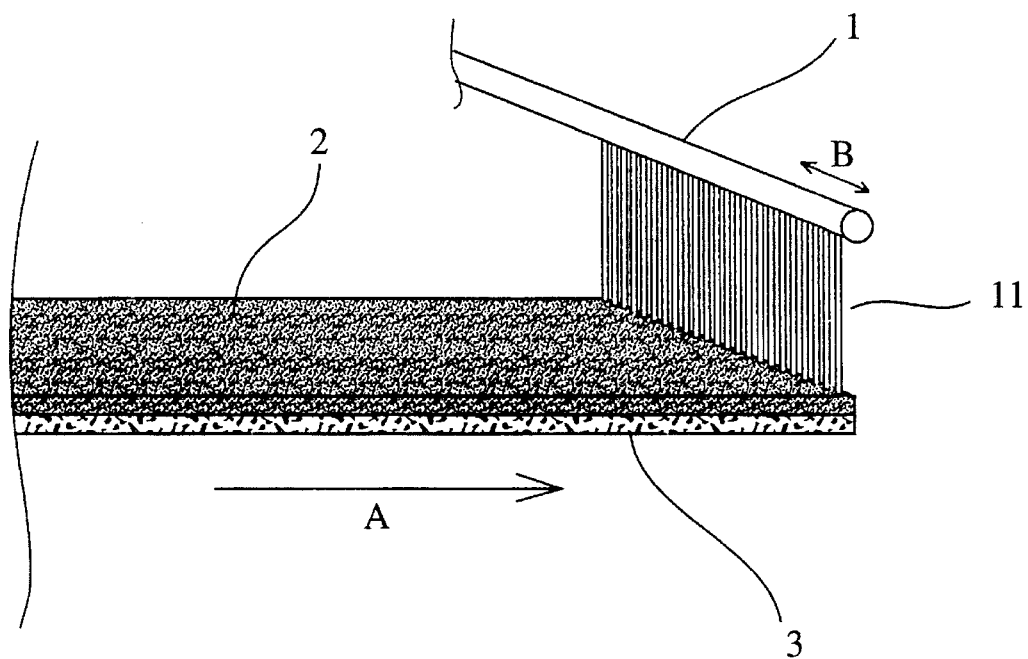
FIG. 1 is a schematic view illustrating a water jet process employed in the production of the laminated non-woven fabric of the present invention.

The first and second non-woven fabrics are stacked each other, and one of the surface of the resulting stack is sprayed with the water jet. The water jet process is illustrated in FIG. 1, in which the water jet apparatus comprises a water jet rod 1 having a plurality of axially spaced nozzles, which is disposed above the stack of the first non-woven fabric 2 and the second non-woven fabric 3 so as to transversely across the stack while facing the nozzles to the stack. Either of the first non-woven fabric 2 or the second non-woven fabric 3 may be uppermost, however, it is generally p referable to place the stack below the water jet rod 1 so that the first non-woven fabric 2 is upstream and the non-woven fabric 3 is downstream with respect to the flow path of the water jet 11 because fibers of a smaller average fiber diameter more easily penetrate into the non-woven fabric layer of a larger average fiber diameter.

The number of the non-woven fabric layers to be stacked is not limited to two. A stack of three layers, four layers or more layers may be sprayed with the water jet to produce a laminated non-woven fabric of three, four or more layers. In case of producing a laminated non-woven fabric of three or more layers, the average fiber diameter, basis weight and gas permeability of each of the third non-woven fabric and the following non-woven fabric layers may be independently selected from the ranges mentioned above as far as the non-woven fabric layers are stacked in the order of average pore size. The average pore size and the thickness of such third and the following non-woven fabric layers are preferably 30–120 μm and 1–10 mm, respectively.

The spray pressure of the water jet 11 from the water jet rod 1 is generally 20–200 kg/cm², preferably 50–150 kg/cm² depending upon the kinds of non-woven fabric and/or the construction of the stack. A spray pressure less than 20 kg/cm² results in insufficient bonding of the non-woven fabric layers. On the other hand, when the spray pressure exceeds 200 kg/cm², the non-woven fabric comes to be likely broken during spraying the water jet 11.

The inter-nozzle spacing is preferably 0.3–2 mm, more preferably 0.3–1 mm. An inter-nozzle spacing less than 0.3 mm makes the nozzle plate less pressure resistant. When the inter-nozzle spacing exceeds 2 mm, the bonding between the non-woven fabric layers becomes insufficient because of small bonding area (small number of entangled regions) and the surface of the sprayed non-woven fabric is roughened. The spray amount of the water jet 11 is 500–1500 liter/min, preferably 600–1200 liter/min per 1 m width.

The stack of the non-woven fabric layers 2 and 3 moves in the direction indicated by an arrow A shown in FIG. 1 while spraying the water jet 11 onto the upper surface of the stack. The feeding speed of the stack is preferably 5–80 m/min, more preferably 10–50 m/min. The productivity of the laminated non-woven fabric is reduced when the feeding speed is less than 5 m/min. On the other hand, a feeding speed exceeding 80 m/min results in insufficient bonding between the non-woven fabric layers. The water jet rod 1 may be reciprocated in the direction nearly perpendicular to the feeding direction (the direction indicated by an arrow B of FIG. 1) of the stack so as to increase the bonding area. The spraying of the water jet may be also conducted by scanning a water jet rod having only one nozzle longitudinally and transversely with respect to the stack in stead of using the water jet rod 1 described above.

The bonding strength between each of the adjacent layers of the laminated non-woven fabric produced as described above is 0.5 kgf/50 mm width, preferably 1–7 kgf/50 mm width when measured by a 180° peeling test with a tensile strength tester.

[2] Laminated non-woven fabric

Figure 2:
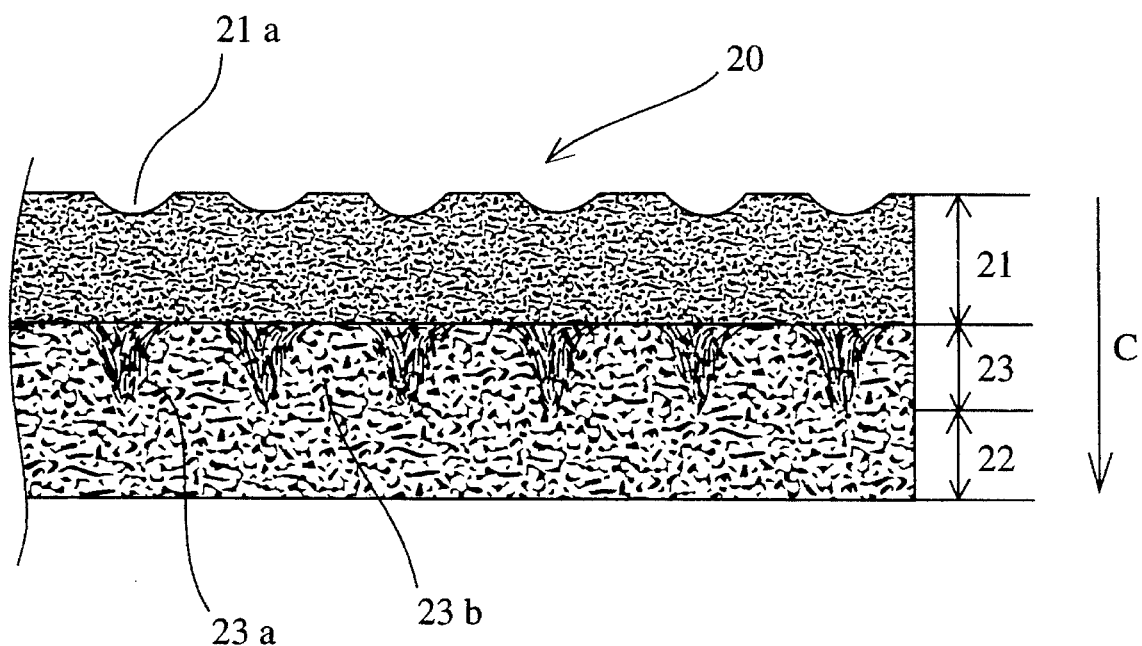
FIG. 2 is a transverse sectional view showing the fibrous structure of the laminated non-woven fabric of the present invention.

A schematic cross sectional view of one of the laminated non-woven fabric according to the present invention, which is taken along the transverse direction of the laminated non-woven fabric, is shown in FIG. 2. In FIG. 2, the laminated non-woven fabric 20 has three layers. A first layer 21 consists of the first non-woven fabric 2, and a second layer 22 consists of the second non-woven fabric 3. Between the first layer 21 and the second layer 22, a third layer 23 is interposed. The third layer 23 consists of the entangled region 23a which comprises the fiber constituting the first non-woven fabric (the first fiber) penetrated into the second non-woven fabric by pressure of the water jet 11 and entangled with the fiber constituting the second non-woven fabric (the second fiber), and the non-entangled region 23b which comprises only the second fiber. A stream of the water jet 11 from a nozzle reaching the surface of the first layer 21 forms there a recess 21a by its pressure, and then passes through the first layer 21 along the direction shown by an arrow C to penetrate the first fiber into the second non-woven fabric. The penetrated first fiber is entangled with the second fiber to form the entangled region 23a. Thus, a pair of the recess 21a and the entangled region 23a is formed along the flow path of the water jet 11.

The first and second layers 21 and 22 are substantially identical with the first and second non-woven fabrics 2 and 3 in their characteristics, and therefore, the average pore size of each of the layers 21 and 22 is the same as that of each of the non-woven fabrics 2 and 3. The average pore size of the third layer 23 is preferably 5–100 μm, more preferably 10–40 μm.

The area ratio of the entangled region 23a (bonding area ratio) is 5% or more, preferably 50% or more, and the practically available upper limit is usually about 80%. The area ratio is calculated based on a cross section of the laminated non-woven fabric taken along the transverse direction thereof, and expressed by the ratio of the total area of the entangled region 23a on the cross section to the total area of the cross section. An area ratio less than 5% is disadvantageous because sufficient bonding strength between the non-woven fabric layers cannot be attained as well as the pressure loss is arisen at the non-entangled region 23b which causes the peeling of the laminated non-woven fabric layers and accumulation of solid matters.

In the third layer 23, the portion nearest the boundary between the first and third layers 21 and 23 is rich in the first fiber. The content of the first fiber decreases downwardly, and the third layer 23 changes to the second layer 22 at the portion where the first fiber comes to be not present.

In the laminated non-woven fabric 20 as shown in FIG. 2, the thickness of the first layer 21 is 0.1–2.0 mm, preferably 0.1–1.0 mm, and 0.1–1.0 mm, preferably 0.5–1.0 mm for the second layer 22. The third layer 23 is preferred to have a thickness of 1–8 mm, more preferably 1–5 mm. The thickness of the third layer 23 is preferably 5–80%, more preferably 50–80% of the total thickness of the laminated non-woven fabric. The total thickness of the laminated non-woven fabric is preferably 0.5–3.0 mm, more preferably 1.0–2.5 mm.

The laminated non-woven fabric 20 of the present invention is used as a filtering medium while preferably setting the second layer 22 having a larger average pore size as the inlet side and the first layer 21 as the outlet side. The laminated non-woven fabric has a fibrous multi-layer construction in which the average pore size gradually changes from one surface to the other surface and has no portion where the average pore size changes abruptly. Therefore, a filter made of the laminated non-woven fabric of the present invention has a good filtering efficiency and suffers from no accumulation of solid matters at the bonded interface, thereby elongating the lifetime of the filter.

The non-woven fabric of the present invention is preferred to have the following additional filtering characteristics:

(1) Initial Efficiency: 50–99.9%, more preferably 70–99.9%, and
(2) Life: 500–3000 cc·2 kgf/cm² or more, more preferably 1000–3000 cc·2 kgf/cm².

The initial efficiency is represented by the ratio of the decrease in turbidity by passing through a filter made of the laminated non-woven fabric to the initial value of turbidity of a liquid. The life is represented by the total volume of a liquid passing through a unit surface area (cm²) of the filter until the pressure loss reaches 2 kgf. Therefore, the larger the value of the life, the lower the pressure loss.

The present invention will be further described while referring to the following Examples which should be considered to illustrate various preferred embodiments of the present invention.

In the following Examples and Comparative Examples, the following melt-blown non-woven fabrics made of polypropylene were used.

|  | Basis Weight (g/m²) | Thickness (mm) | Gas Permeability (cc/cm²/sec) | Average Pore Size (μm) | Average Fiber Diameter (μm) |
|---|---|---|---|---|---|
| PPnw-1 | 30 | 0.56 | 17 | 14 | 0.8 |
| PPnw-2 | 30 | 0.56 | 34 | 20 | 1.5 |
| PPnw-3 | 40 | 0.64 | 50 | 30 | 5 |
| PPnw-4 | 100 | 1.2 | 42 | 40 | 8 |

Each of the properties of the non-woven fabric was measured or calculated as follows.

(1) Thickness: Measured according to SEM method.
(2) Gas Permeability: Measured according to JIS L1096 using a Frasil test machine.
(3) Average Pore Size: Measured by a porometer.
(4) Initial Efficiency: The turbidity ($\tau$) of a fluid before and after filtering w as calculated from the following equation:

$$\tau = (1/L) \times ln(I_0/I)$$

wherein $I_0$ is the intensity of incident light, I is the intensity of transmitted light, and L is the optical path. The initial efficiency was calculated from the following equation:

$$\text{Initial Efficiency (\%)} = (\tau_{in} - \tau_{out})/\tau_{in} \times 100$$

wherein $\tau_{in}$ and $\tau_{out}$ are turbidities before and after filtering, respectively.

EXAMPLES 1 to 4

Each stack of three or four melt-blown non-woven fabrics (PPnw-1 to PPnw-4), as shown in Table 1, was boned each other by water jet under the conditions shown in Table 1 to produce each laminated non-woven fabric. The thickness, average pore size, initial efficiency, and life of each laminated non-woven fabric are shown in Table 1.

TABLE 1

|  | Example 1 | Example 2 | Example 3 | Example 4 |
|---|---|---|---|---|
| Production Conditions |  |  |  |  |
| Non-Woven Fabric |  |  |  |  |
| First layer | PPnw-1 | PPnw-1 | PPnw-2 | PPnw-2 |
| Second layer | PPnw-2 | PPnw-3 | PPnw-3 | PPnw-3 |
| Third layer | PPnw-3 | PPnw-4 | PPnw-4 | — |
| Fourth layer | PPnw-4 | — | — | — |
| Spray pressure of water jet (kg/cm²) | 80 | 80 | 80 | 80 |
| Spray amount of water jet (liter/min/1 m width) | 800 | 800 | 800 | 800 |
| Nozzle spacing (cm) | 0.3 | 0.3 | 0.3 | 0.3 |
| Feeding speed (m/min) | 20 | 20 | 20 | 20 |
| Bonding area ratio (%) | 50 | 50 | 50 | 50 |
| Properties |  |  |  |  |
| Thickness (mm) | 1.88 | 1.60 | 1.89 | 0.73 |
| Gas Permeability (cc/cm²/sec) | 4.0 | 6.0 | 7.1 | 11.8 |
| Average Pore Size (μm) | 15 | 18 | 18 | 19 |
| Initial Efficiency (%) | 74 | 53 | 44 | 35 |
| Life (cc · 2 kgf/cm²) | 900 | 915 | 1450 | 1430 |

COMPARATIVE EXAMPLE 1–4

The same procedures as in Examples 1–4 were repeated except that each of the non-woven fabric layers were bonded together by mechanical pressing in place of spraying water jet to produce each laminated non-woven fabric. The thickness, average pore size, initial efficiency, and life of each laminated non-woven fabric are shown in Table 2.

TABLE 2

|  | Comparative Example 1 | Comparative Example 2 | Comparative Example 3 | Comparative Example 4 |
|---|---|---|---|---|
| Production Conditions |  |  |  |  |
| Non-Woven Fabric |  |  |  |  |
| First layer | PPnw-1 | PPnw-1 | PPnw-2 | PPnw-2 |
| Second layer | PPnw-2 | PPnw-3 | PPnw-3 | PPnw-3 |
| Third layer | PPnw-3 | PPnw-4 | PPnw-4 | — |
| Fourth layer | PPnw-4 | — | — | — |
| Properties |  |  |  |  |
| Thickness (mm) | 1.90 | 1.85 | 1.90 | 0.72 |
| Gas Permeability (cc/cm²/sec) | 4.5 | 6.2 | 7.1 | 11.3 |
| Average Pore Size (μm) | 14 | 16 | 17 | 17 |
| Initial Efficiency (%) | 72 | 55 | 38 | 35 |
| Life (cc · 2 kgf/cm²) | 800 | 800 | 1200 | 1220 |

As can be seen from the above results, the laminated non-woven fabrics of Examples 1–4 showed good initial efficiency and high values of life as compared with the corresponding laminated non-woven fabrics of Comparative Examples 1–4. Such laminated non-woven fabrics of the present invention are suitable for use in various types of filter such as electric battery separator, heat-resistant filter, etc.

What is claimed is:

1. A laminated non-woven fabric filtering medium, which comprises a plurality of non-woven fabric layers having different average pore sizes and laminated in the order of the average pore size, and a plurality of entangled regions interposed between any of adjacent two non-woven fabric layers which is formed by causing fibers of one of said adjacent two non-woven fabric layers to penetrate into the other layers to entangle the penetrated fibers with fibers of the other layers.

2. The laminated non-woven fabric filtering medium according to claim 1, wherein an initial efficiency of said laminated non-woven fabric as defined by the following formula:

$$\text{Initial Efficiency } (\%) = (\tau_{in} - \tau_{out})/\tau_{in} \times 100$$

wherein each of $\tau_{in}$ and $\tau_{out}$ is a respective turbidity before and after filtering, is 50–99.9%.

3. The laminated non-woven fabric filtering medium according to claim 1, wherein a life as defined by the total volume of a liquid passing through a unit surface area of said laminated non-woven fabric until a pressure loss reaches 2 kgf is 500–3000 cc-2 kgf/cm$^2$.

4. The laminated non-woven fabric filtering medium according to claim 1, wherein each of said entangled regions continuously extends at least along a longitudinal direction of said laminated non-woven fabric filtering medium.

5. The laminated non-woven fabric filtering medium according to claim 1, wherein said non-woven fabric layers comprises a first outer non-woven fabric having an average pore size of 5–30 μm, an internal non-woven fabric having an average pore size of 20–100 μm and a second outer non-woven fabric having an average pore size of 30–120 μm, with the proviso that said first outer non-woven fabric, internal non-woven fabric and second outer non-woven fabric are stacked in the order of said average pore size.

6. A method of producing the laminated non-woven fabric filtering medium as defined in claim 1, which comprises the steps of:

stacking a plurality of non-woven fabric layers having different average pore sizes in the order of the average pore size; and bonding the stacked non-woven fabric layers by spraying a water jet onto one of the surfaces of the resulting stack to cause fibers of the upstream layers with respect to the flow path of said water jet to penetrate into the adjacent, downstream layers thereby entangling the penetrated fibers with fibers of said adjacent, downstream layers while relatively moving said water jet along a longitudinal direction of said stack.

7. The method of producing the laminated non-woven fabric filtering medium as in claim 6, wherein said water jet is additionally moved along a transverse direction of said stack.

* * * * *

UNITED STATES PATENT AND TRADEMARK OFFICE
CERTIFICATE OF CORRECTION

PATENT NO. : 5,609,947
DATED : March 11, 1997
INVENTOR(S) : T. KAMEI et al.

It is certified that error appears in the above-identified patent and that said Letters Patent is hereby corrected as shown below:

Column 7

Claim 2, line 20, change "$(\%) = (T_{in},T_{out})/T_{in} \times 100$" to --$(\%) = (T_{in} - T_{out}) / T_{in} \times 100$--.

Signed and Sealed this

Twenty-fifth Day of November, 1997

Attest:

BRUCE LEHMAN

*Attesting Officer*  *Commissioner of Patents and Trademarks*